Aug. 28, 1923.
A. H. FINLAYSON
1,466,393
EMERY WHEEL DRESSING TOOL
Filed Jan. 16, 1922
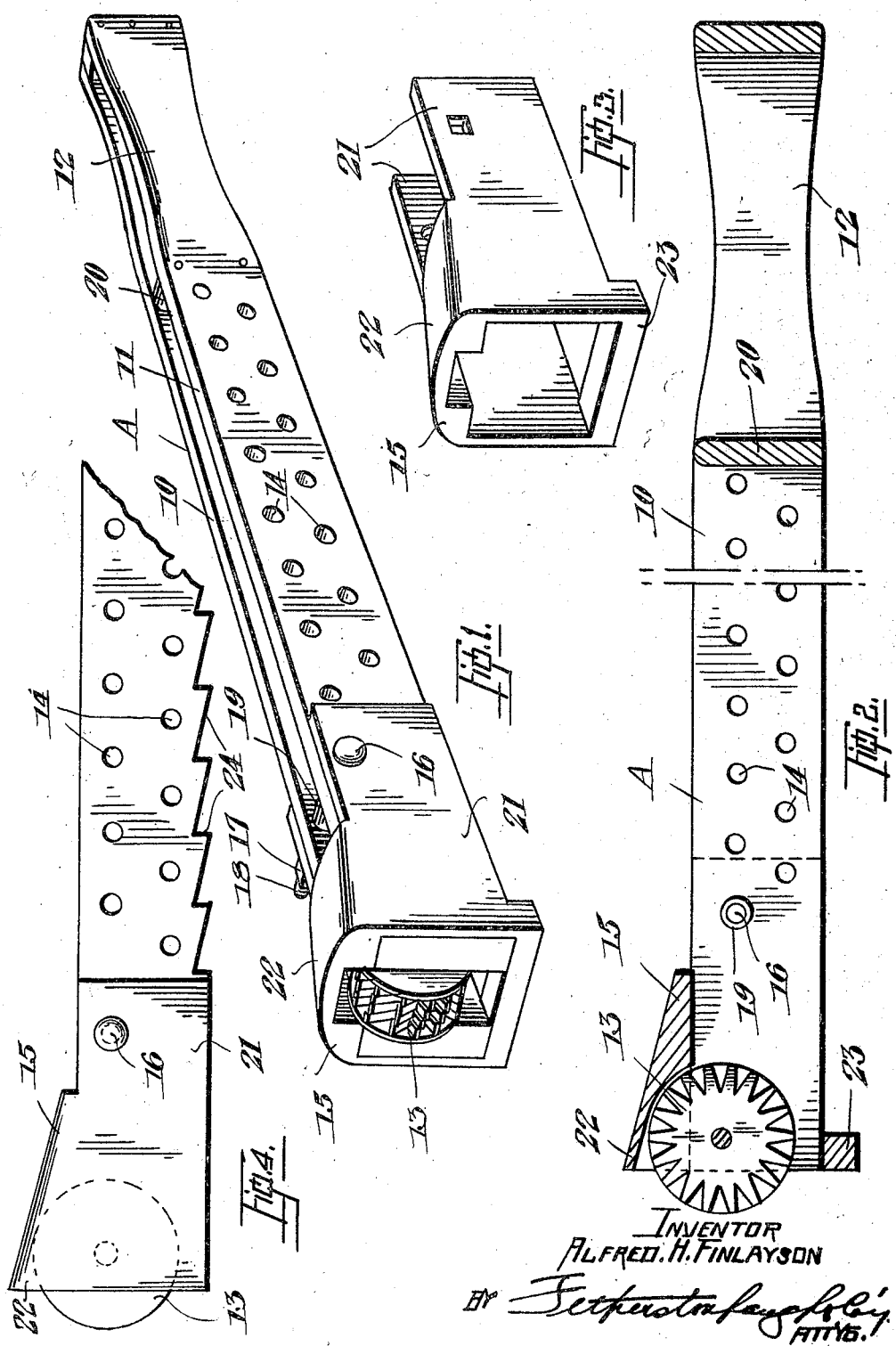
INVENTOR
ALFRED. H. FINLAYSON Patented Aug. 28, 1923.

1,466,393

UNITED STATES PATENT OFFICE.

ALFRED HARGREAVES FINLAYSON, OF BROCKVILLE, ONTARIO, CANADA.

EMERY-WHEEL DRESSING TOOL.

Application filed January 16, 1922. Serial No. 529,641.

*To all whom it may concern:*

Be it known that I, ALFRED HARGREAVES FINLAYSON, a subject of the King of Great Britain, and resident of Brockville, in the Province of Ontario and Dominion of Canada, have invented certain new and useful Improvements in Emery-Wheel Dressing Tools, of which the following is a specification.
This invention relates to improvements in emery wheel dressing tools, and the objects of the invention are to construct a dressing tool of this class that can be readily and accurately adjusted to take up the wear in the operation of the tool.

A further object is to provide an efficient and economically constructed tool of this character which will be particularly adapted for dressing emery, corundum and composite wheels.

A still further object is to provide an adjustable means in a tool of this kind for strengthening the bearings and protecting them against a severe strain, which causes them to chatter resulting in an uneven cutting face on the wheel which is being dressed.

With these and other objects hereinafter more fully described, the invention consists essentially of a rotary dressing member pivotally mounted between a pair of spaced handle members having a plurality of orifices therein, and provided with a slidable adjustable member thereon, designed to fit operatively over the rotary member and to slide on the handle member.

Referring to the drawings, in which like characters of reference indicate corresponding parts in the several figures;
Figure 1 is a perspective view of the tool.
Figure 2 is a vertical section.
Figure 3 is a perspective view of the slidable member.
Figure 4 is a side elevation of an alternative form.

In the drawings, A is the dressing tool comprising a pair of handle members 10 and 11 in spaced relationship to each other terminating at one end in a handle proper 12 and having pivotally mounted therebetween at the other end the rotary dressing member 13.

The sides of the spaced handle members 10 and 11 are provided with a plurality of orifices therein 14 registering with each other in the corresponding sides, and in staggered relationship to one another on each side and designed to receive therein the shaft or spindle on which is rotatably mounted the dressing member 13.

15 is an adjustable securing member designed to slide on the handle members 10 and 11, and to fit over the rotary member 13, whereby the handle members are held securely in spaced relationship to one another by bolt securing means 16 extending through the sides of the member 15 and also through the holes 14 in members 10 and 11, and provided with a nut 17 on the threaded end thereof 18.

19 is a tubular member on the bolt 16 between the members 10 and 11 to keep them spaced in alignment with the securing means 20 through the handle end.

The member 15 as here shown is open at both ends and provided with extended sides 21 to fit snugly on the sides of the tool handle, the sides 21 being connected overhead by the top or cap portion 22.

23 is a stem on the member 15 designed to grip the tool rest for the tool in operation. In Figure 4 I have shown an alternative form of my invention, in which instead of the stem 23 on the member 15, I use notches 24 in the sides of the handle member.

In operation the tool as shown in Figure 1 is held securely in position by means of the stem 23 and the handle end to engage the rotary member 13 with a revolving emery wheel to dress it.

On the bearings for the bolt 16 becoming worn, through the strain of work, the member 15 is moved a step backward by changing the bolt 16 to the next available orifice in the sides 10 and 11 and at the same time the shaft or spindle on which the member 13 is mounted is moved back to the next set of holes, the tool being first reversed. When these next available orifices are in turn worn out, the bolt is again loosened and the tool slid from the member 15, then turned up side down and again slid into the member 15, when the bolt is passed through the next available orifice in staggered relationship to the first one, and so on, thus maintaining true and accurate work by the rotary dressing member 13. It will thus be seen that on the first set of holes becoming useless, it is only necessary to unbolt and reverse the handle, including the members 10 and 11 and then move the spindle carrying the dressing member 13 back to the next set of holes and then rebolting the member 15 after also moving it back one set of holes and so on, the protruding ends of the members 10 and 11 consequent on the dressing member being moved back will be quickly ground down in contact with the emery wheel. It will also be seen from the foregoing that the apertured sides of the tool itself suit a double purpose, namely by first making provision for the spindle of the dressing member and secondly by providing means for securing the retaining member 15 by means of the bolts 16.

In the alternative form as shown in Figure 4, instead of the stem 23, the notches 24 on the member 15 being moved backwards, are used to grip the tool rest.

What I claim as my invention is:

1. An emery wheel dressing tool comprising a rotary dressing member, a pair of spaced handle members having a plurality of orifices in staggered relationship to one another therein, a slidably adjustable securing member designed to fit over the rotary member and to slide on the handle member, means extending through the head piece and through the orifices in the handle whereby the rotary member is held securely in position, and means on the aforementioned means designed to maintain the handle members in spaced relationship to one another.

2. An emery wheel dressing tool comprising a rotary dressing member in one end of a pair of spaced handle members, a plurality of staggered orifices through said handle members, designed to register with one another, an adjustable securing member formed with a stem and designed to fit snugly on the handle members, bolt securing means through the securing member and through the orificed handle members, whereby the handle members are secured in position to support the rotary member, and whereby in combination with said orifices, the securing member can be adjusted backwards.

3. The combination with a two piece handle with side orifices, and notches therein, and a rotary dressing member, of a securing member designed to slide on said handle, and means for adjustably securing said member to the handle.

In witness whereof I have hereunto set my hand in the presence of two witnesses.

ALFRED HARGREAVES FINLAYSON.

Witnesses:
 MARION VAN DUSEN,
 KATE PHILLIPS.